United States Patent [19]

Omae et al.

[11] Patent Number: 4,721,761
[45] Date of Patent: Jan. 26, 1988

[54] PROCESS FOR THE PREPARATION OF ETHYLENE COPOLYMER

[75] Inventors: Tadayuki Omae; Noboru Yamaguchi; Akira Kondo; Takayuki Okada, all of Chiba, Japan

[73] Assignee: Sumitomo Chemical Company, Limited, Osaka, Japan

[21] Appl. No.: 892,030
[22] PCT Filed: Nov. 25, 1985
[86] PCT No.: PCT/JP85/00652
§ 371 Date: Jul. 28, 1986
§ 102(e) Date: Jul. 28, 1986
[87] PCT Pub. No.: WO86/03207
PCT Pub. Date: Jun. 5, 1986

[30] Foreign Application Priority Data

Nov. 27, 1984 [JP] Japan ............... 59-251097

[51] Int. Cl.$^4$ .................. C08F 2/42; C08F 210/02
[52] U.S. Cl. ............................ 526/64; 526/272; 526/273; 526/318.6; 526/320; 526/329
[58] Field of Search ............... 526/64, 82, 272, 318.6, 526/320, 329, 273; 252/52 A

[56] References Cited

FOREIGN PATENT DOCUMENTS

| 0122185 | 10/1976 | Japan | 526/64 |
| 0000886 | 1/1977 | Japan | 526/64 |
| 870480 | 6/1961 | United Kingdom | 526/329 |
| 1107079 | 3/1968 | United Kingdom | 526/329 |
| 1503397 | 3/1978 | United Kingdom | 526/329 |
| 0734217 | 5/1980 | U.S.S.R. | 526/82 |

Primary Examiner—Joseph L. Schofer
Assistant Examiner—F. M. Teskin
Attorney, Agent, or Firm—Sughrue, Mion, Zinn, Macpeak and Seas

[57] ABSTRACT

The present invention relates to an improved process for the preparation of an ethylene copolymer. In the copolymerization of a comonomer copolymerizable with ethylene and ethylene at a pressure of 500 to 3,000 kg/cm$^2$ and at a temperature of 100° to 350° C. using an initiator in the presence or absence of a chain transfer agent, a gap between a packing and a retainer of an ultrahigh pressure pump for copolymerization is filled with a grease containing a polymerization inhibitor. The comonomer and a part or the whole of ethylene are mixed under an elevated pressure and then introduced into a reaction vessel. In accordance with the present invention, leakage of the comonomer from the packing of the pump, clogging of a conduit and breakage of the pump can be prevented, thus improving operation efficiency. Furthermore, the effect of diffusion of the comonomer into ethylene gas is attained sufficiently, thus enabling the production of a high-quality polymer having less gel content. This facilitates the reaction control, improving the reaction stability.

4 Claims, 6 Drawing Figures

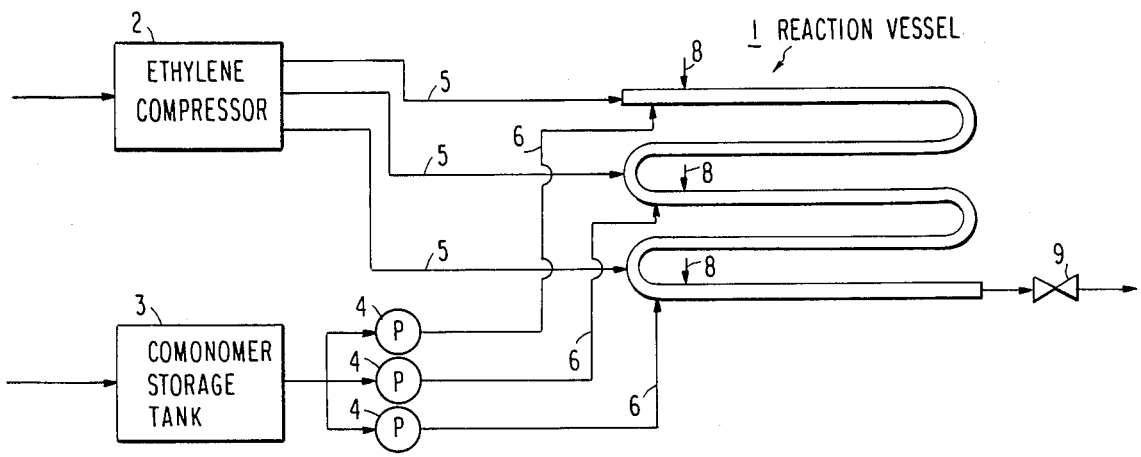
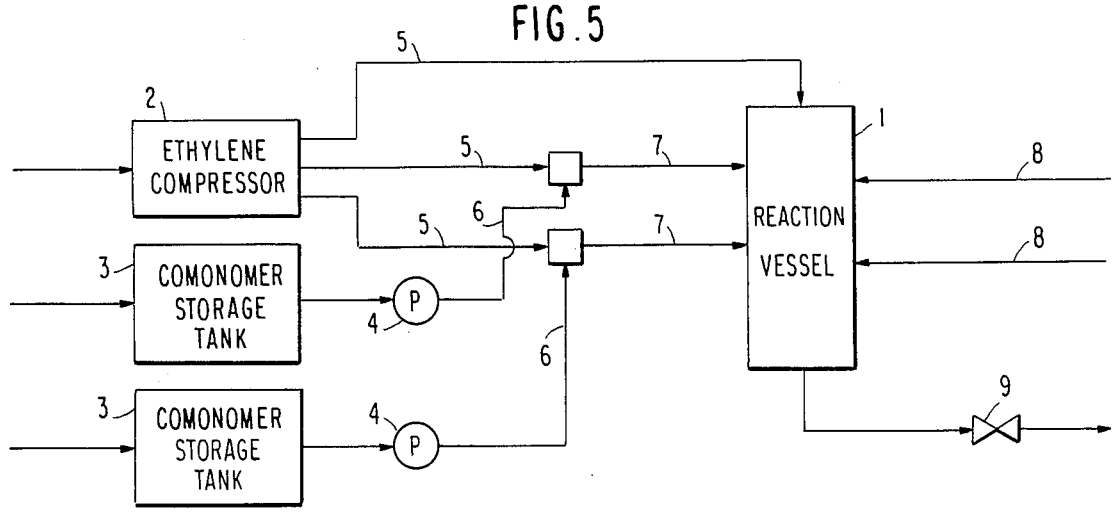
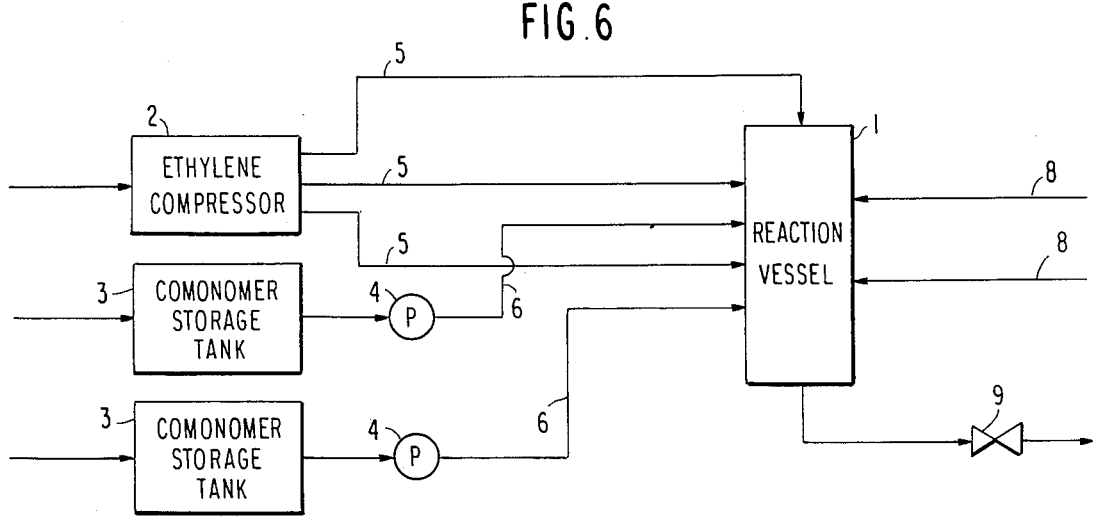

PROCESS FOR THE PREPARATION OF ETHYLENE COPOLYMER

TECHNICAL FIELD

The present invention relates to an improved process for the preparation of an ethylene copolymer. More particularly, the present invention relates to a process for prolonged, stable and continuous preparation of a high-quality ethylene copolymer by prevention of polymerization of comonomers in an ultrahigh pressure pump which compresses the comonomers to a reaction pressure and in a conduit and improvement in diffusion of the comonomers into ethylene gas in a reaction vessel.

BACKGROUND TECHNIQUE

Polyethylene is a crystalline, non-polar thermoplastic resin. Polyethylene is also easier to mold and has higher strength and elongation, flexibility and chemical resistance than other thermoplastic or thermosetting resins. Thus, polyethylene has excellent properties and is one of the most important general-purpose resins. However, polyethylene is disadvantageous in that its lack of polar groups causes poor adhesion, oil resistance, dyeability, and heat resistance.

Various studies have been made to improve polyethylene so that it is given characteristic properties without deteriorating the above inherent properties thereof to be developed for formation of composite materials with other materials.

In particular, copolymerization of ethylene and a vinyl compound having polar groups is widely industrially conducted because it is advantageous in that it enables the introduction of polar groups in a high concentration and the production thereof in the same plant as used.

However, high-pressure radical copolymerization of ethylene and such a comonomer having polar groups involves a problem of reactivity of the comonomer. That is, comonomers having a relatively small polymerization reactivity (i.e., the Q value is less than 0.1) such as vinyl acetate and vinyl propionate are generally introduced into a system at a line having a pressure of lower than the reaction pressure, such as, for example, at an inlet line of an ultrahigh pressure compressor, compressed together with ethylene by the ultrahigh pressure compressor to the reaction pressure, and then introduced into the reaction vessel. On the other hand, in the case where comonomers having a high reactivity are used, when a mixture of ethylene and such a comonomer is compressed by an ultrahigh pressure compressor, a copolymer of ethylene and the comonomers or a homopolymer of the comonomer may be produced in an interior of the compressor, an outlet conduit of the compressor, and other apparatus due to compression heat. The polymer thus produced attaches to the interior of the compressor, the outlet conduit of the compressor and other apparatus, causing not only an increase in the amount of leaking gas from a cylinder of the compressor and an increase in pressure loss between the compressor outlet and the reaction vessel which will increase the discharge pressure of the compressor but also a cause to clog the conduits, whereby it causes a very dangerous condition in operation. In order to avoid these troubles, when comonomers having a high reactivity are used, the comonomers are compressed to the reaction pressure by an ultrahigh pressure pump, singly or together with a solvent, and then carried to the reaction vessel.

In general, as such comonomers there are used those which are liquid or solid at ordinary temperature and at atmospheric pressure. A plunger type pump is used as the ultrahigh pressure pump to compress the comonomer to the reaction pressure and carry it to the reaction vessel. As a packing for this type of a pump there is generally used a self-bound V-shaped packing. However, when a comonomer having a high polymerization reactivity enters and accumulates in a V-shaped groove on the packing, heat polymerization takes place in a relatively short period of time due to sliding heat generated in sliding portions of the plunger and the packing. This causes a loss of degree of freedom of the packing, resulting in leakage therefrom. Furthermore, the attachment of the polymer thus produced may even lead to breakage of the pump.

Moreover, the polymer thus produced also accumulates in the vicinity of inlet and discharge valves and in the conduits of the pump, causing an increase in loss of the pressure in conduit which may cause clogging of the conduit. This thus causes a very dangerous condition in operation.

As the method for carrying the comonomers to the reaction vessel, there is generally employed a method in which the comonomers are carried directly to the reaction vessel through a single conduit provided between the ultrahigh pressure pump for compression of the comonomers and the reaction vessel. In this process, however, there is a high possibility that by heat transfer from the wall of the reaction vessel the temperature in the vicinity of the inlet nozzle attached to the wall of the reaction vessel rises close to the reaction temperature (generally 150° to 250° C.), to cause heat homopolymerization of the comonomer. In particular, when the reaction is interrupted or stopped, since the comonomers remain in the vicinity of the nozzle, there is a high possibility that polymerization occurs therein. When a polymer produced by heat polymerization of the comonomer in the vicinity of the nozzle attaches to the wall of the conduit, the pressure loss between the pump and the reaction vessel increases, which causes an increase in the discharge pressure of the pump, whereby the operation is in a dangerous state. Furthermore, when the comonomers undergo heat polymerization in the vicinity of the nozzle after the operation is finished, it causes clogging of the nozzle which may break the pump when the operation resumes. In order to avoid these troubles, when the reaction is in progress, the reaction must be immediately interrupted, or when the reaction is finished, the pump, the conduits and the inlet nozzle must be immediately dismantled and cleaned.

Moreover, when a comonomer having a high homopolymerizability, i.e., a comonomer having a Q value, as defined hereinafter, of 0.1 or more, is directly introduced into the reaction vessel, such a comonomer is not sufficiently dispersed into ethylene gas in the reaction vessel. This causes local homopolymerization of the comonomer by-production of gel-like materials in the finished product or likely leads to abnormal reaction. Furthermore, the resulting copolymer often lacks randomness, thus giving a trouble in the properties of the product.

Thus, the production of an ethylene copolymer using a comonomer having a high reactivity has difficulty in prolonged operation and is remarkably poor in operation efficiency and safety as compared with the production of polyethylene and the production of a copolymer of ethylene and a comonomer having a low reactivity.

DISCLOSURE OF THE INVENTION

It is an object of the present invention to solve these problems. More particularly, it is an object of the present invention to provide a process for prolonged and stable production of a high-quality ethylene copolymer while prevention of heat polymerization of comonomers around an ultrahigh pressure pump for compressing and carrying the comonomers and in a carrier conduit by addition of a small amount of a polymerization inhibitor and prevention of clogging of an inlet nozzle to the reaction vessel by improvement of the process for introducing ethylene and the comonomers into the reaction vessel.

The present invention is intended for a process for the preparation of an ethylene copolymer which comprises introducing one or more comonomers with a Q value (copolymerization reactivity index) of 0.1 or more, which are copolymerizable with ethylene, into a tank-shaped or tubular reaction vessel by means of an ultrahigh pressure pump and copolymerizing the comonomer or comonomers with ethylene at a pressure of 500 to 3,000 kg/cm² and at a temperature of 100° to 350° C. using an initiator in the presence or absence of a chain transfer agent, characterized in that (1) a gap between a packing and a retainer in the ultrahigh pressure pump for the comonomer is filled with a grease-like oil having incorporated thereinto 2 to 20% by weight of a polymerization inhibitor and, if desired, 100 to 500 ppm by weight of a polymerization inhibitor is added to a lubricating oil for the ultrahigh pressure pump, and that (2) the comonomer or comonomers and a part or the whole of ethylene which has been compressed by a compressor are previously mixed with each other at the point where heat transfer from the reaction vessel is negligible before being introduced into the reaction vessel.

Q value can be expressed by the equation:

$$Q_j = \frac{P_i \exp(-e_i \cdot e_j)}{k_{ij}}$$

wherein Pi represents a constant indicating the reactivity of a propagating polymer radical; ei and ej each represents a constant proportional to the charge; kij represents a propagation reaction rate constant of radical copolymerization; suffix i represents ethylene; and suffix j represents a comonomer.

It can be said that the greater the Q value, the better the reactivity is.

In mixing a comonomer having a Q value of 0.1 or more with ethylene for copolymerization, when dispersion state of the comonomer into ethylene is poor, it is more apt to form a block copolymer at a low conversion, impairing the quality of the product.

The Q value is described in detail in "Copolymerization I-Reaction Analysis" (edited by KOBUNSHI GAKKAI, pp. 1-98, published by BAIFUKAN in 1975).

A first characteristic of the present invention is that a gap between a packing and a retainer in an ultrahigh pressure pump for compressing and carrying the comonomer is filled with a polymerization inhibitor and a lubricating oil for a sliding portion is added with a polymerization inhibitor, whereby polymers produced by heat hompolymerization of the comonomer can be prevented from attaching to an inner wall of a cylinder, inlet and discharge valves, and conduit walls. Possible lubrication processes for the sliding portions of a plunger and the packing by the lubricating oil include an oil injection process and an oil dip process. Either one of these processes may be used.

A second characteristic of the present invention is that the comonomer a pressure of which has been increased to the reaction pressure and ethylene which has been compressed to the reaction pressure are previously mixed with each other before being introduced into the reaction vessel, whereby any possible polymerization of the comonomer in an inlet nozzle leading to the reaction vessel can be avoided and the diffusion of the comonomer into ethylene gas in the reaction vessel can be sufficiently accomplished, resulting in production of a high-quality copolymer having an improved random copolymerizability.

BRIEF DESCRIPTION OF THE DRAWINGS

FIGS. 1 to 6 show schematic views of the vicinity of the reaction vessel illustrating embodiments of the present invention. FIGS. 3, 4 and 6 show copolymerization systems which have been heretofore generally conducted for comparison.

Figure 1:
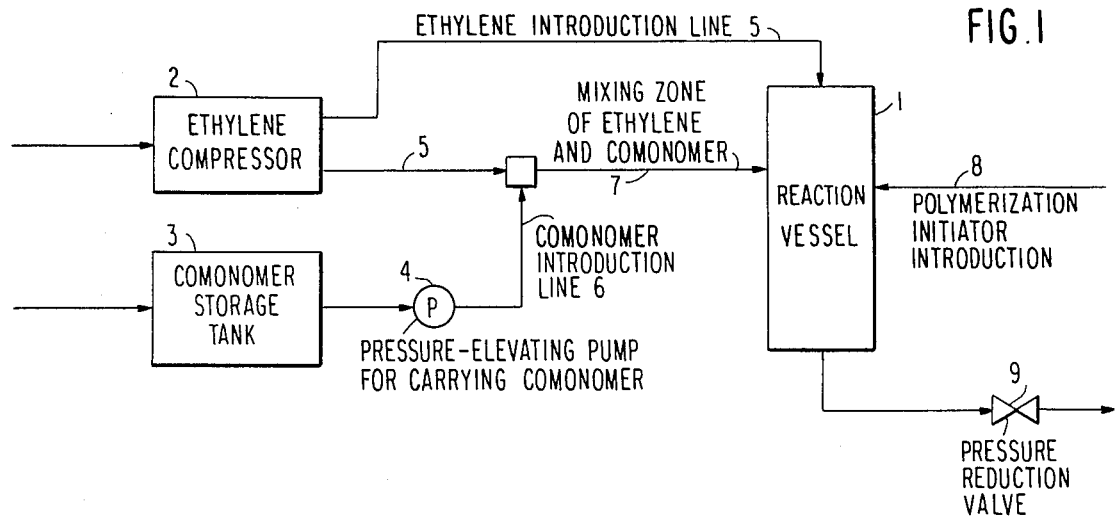

In the Figures, numeral 1 represents a reaction vessel; numeral 2 represents an ethylene compressor; numeral 3 represents a comonomer storage tank; numeral 4 represents a pressure-elevating pump for carrying comonomer; numeral 5 represents an ethylene introduction line; numeral 6 represents a comonomer introduction line; numeral 7 represents a mixing zone of ethylene and comonomer; numeral 8 represents polymerization initiator introduction; and numeral 9 represents a pressure reduction valve.

MOST PREFERRED EMBODIMENTS OF THE PRESENT INVENTION

The present invention is hereinafter described in detail.

In order to embody the present invention, an ordinary continuous high-pressure polyethylene producing apparatus is used.

The reaction vessel may be of either tank-shaped or tubular type and further, it may comprise a series or parallel combination of two or more of these reaction vessels. Further, ethylene which has been compressed by an ultrahigh pressure compressor to the reaction pressure is introduced into the reaction vessel at one or more points thereof.

FIGS. 1 to 6 show examples (including comparative examples) of a conduit in the vicinity of the reaction vessel. Furthermore, in order to improve the mixing of the comonomer and ethylene, a mixing zone (7) may be provided with a stationary mixing apparatus.

The reaction pressure is in the range of 500 to 3,000 kg/cm², preferably 700 to 2,500 kg/cm². The reaction temperature is in the range of 100° to 350° C., preferably 150° to 250° C.

In the present invention, all polymerization initiators and chain transfer agents which are known to be used in copolymerization of ethylene and comonomers can be used.

Examples of the polymerization initiator include hydrogen peroxide; oxygen; organic peroxides such as diethyl peroxide, tert-butyl hydroperoxide, di-tert-butyl peroxide, dicumyl peroxide, tert-butyl peroxybenzoate, tert-butyl peroxyacetate, tert-butyl peroxy-2-ethylhexanoate, tert-butyl peroxypivalate, 2-ethylhexanoyl peroxide, pivalyl peroxide, and isopropyl oxydicarbonate; and azo compounds such as azobisisobutyronitrile and azobis-2,2-diphenyl acetonitrile.

Examples of the chain transfer agent include paraffins such as ethane, propane, butane, heptane, hexane, and pentane; cycloparaffins such as cyclohexane and methylcyclohexane; olefins such as propylene, butene-1, and hexen-1,3-methylpentene-1; aldehydes such as formaldehyde, acetaldehyde, and propionaldehyde; ketones such as acetone, methyl ethyl ketone, diethyl ketone, and cyclohexanone; and aromatic hydrocarbons such as benzene, toluene, and xylene.

Examples of comonomers which can be used in the present invention include the following conomoners having a Q value of 0.1 or more. The figure in the parenthesis indicates the Q value described in "Copolymerization I-Reaction Analysis" (edited by KOBUNSHI GAKKAI, pp. 396–403, 1975).

That is, examples include acrylic acid (1.27); methacrylic acid (2.34); acrylic and methacrylic esters having 1 to 8 carbon atoms in a saturated alcohol component such as methyl acrylate (0.42), ethyl acrylate (0.42), methyl methacrylate (0.74), ethyl methacrylate (0.70), butyl acrylate (0.43), 2-ethylhexyl acrylate (0.41), glycidyl acrylate (0.55), glycidyl methacrylate (0.85), dimethylaminoethyl methacrylate (0.68), and diethylaminoethyl methacrylate (2.08); maleic anhydride (0.23); styrene (1.00); N-vinylpyrrolidone (0.14), and 2-vinylpyridine (1.30).

The comonomer used in the present invention can be used singly or in admixture of two or more thereof. That is, the process of the present invention can be effectively applied to, for example, the case where maleic anhydride is introduced into the reaction vessel in the form of a solution in ethyl acrylate or ethyl methacrylate.

Examples of the grease-like oil into which a polymerization inhibitor is incorporated and which is filled into the gap between the packing and the retainer in the ultrahigh pressure pump for compressing and carrying the comonomer include various grease-like oils insoluble in the comonomer. Examples of the lubricating oil used in the ultrahigh pressure pump include good-quality mineral oils such as liquid paraffin, synthetic oils such as polybutene and polyalkylene glycols, and mixtures thereof.

The polymerization inhibitors used in the present invention are generally nucleus-substituted phenols or bisphenols. In this case, each phenolic nucleus contains at least one substituent selected from the group consisting of hydroxyl, carboxyl, carbonyl, nitro, amino, amino lower alkyl, lower alkylamino, lower alkyl, lower alkenyl, and lower alkoxy. Specific examples include hydroquinone monomethyl ether, p-aminophenol, p-hydroxybenzaldehyde, hydroquinone, 3,5-xylenol, 2,6-diisopropylphenol, and 2,6-di-tert-butyl-4-methylphenol. Besides the above, p-benzoquinone, phenothiazine and nitrosomesitylene are also effective as the polymerization inhibitor.

The above polymerization inhibitor used in the present invention can be used singly or in admixture of two or more thereof.

The amount of the polymerization inhibitor incorporated into the grease-like oil is in the range of 2 to 20%, preferably 5 to 15% by weight, based on the grease-like oil. When the content of the polymerization inhibitor is less than 2% by weight, the effect of polymerization inhibition is not sufficient, whereas when it exceeds 20% by weight, no further effect is found.

While the amount of the polymerization inhibitor mixed with the lubricating oil may vary with the kind of the polymerization inhibitor, the kind of the comonomer and the temperature of gas discharged from the outlet of the ultrahigh pressure pump, it can be in the range of 100 to 5,000 ppm, preferably 500 to 3,000 ppm by weight based on the lubricating oil. When the content of the polymerization inhibitor is less than 100 ppm, the effect of polymerization inhibition is not sufficient, whereas when it exceeds 5,000 ppm, no further effect is found and, rather, it causes deterioration of unit of the polymerization initiator in the copolymerization.

It is effective and desired in the light of stable operation and production of high-quality copolymers of the object of the present invention as well as storage stability of the comonomer to add and dissolve about 3 to 2,000 ppm of the above polymerization inhibitor or a mixture thereof to the comonomer.

EXAMPLES

The effects of the present invention are hereinafter described in detail with reference to the following examples of the present invention and comparative examples, but the present invention is not construed as being limited thereto.

EXAMPLE 1

200 kg/hr of ethylene and 2.6 mol% (based on ethylene) of propane were compressed by an ultrahigh pressure compressor to 1,500 kg/cm$^2$. The mixture was then mixed with 3.3 kg/cm$^2$ of glycidyl methacrylate (Q value=0.85), a pressure of which had been increased to 1,500 kg/cm$^2$ by an ultrahigh pressure pump using a silicone grease containing 10% of p-benzoquinone as a polymerization inhibitor filled in a V-shaped groove between a packing and a retainer and a polybutene containing 2,000 ppm of p-benzoquinone as a polymerization inhibitor added to a lubricating oil. These polymerization inhibitors had been incorporated into the system while a plunger and the packing were assembled. The mixture was carried into a tank-shaped reaction vessel (volume: 54 l; L/D=12) via a conduit system as shown in FIG. 1 and continuously polymerized with 8 g/hr of tert-butyl peroxy-2-ethylhexanoate being added thereto as a polymerization initiator at a reaction temperature of 195° C. As a result, 26 kg/hr of an ethylene-glycidyl methacrylate copolymer having a melt index (determined in accordance with JIS K-6760) of 2 g/10 min., a density of 0.93, and a glycidyl methacrylate content of 12% by weight was obtained.

A stable operation could be performed for about 150 hours after initiation of the polymerization. The operation was then stopped to check the ultrahigh pressure pump and the conduit. As a result, attachment of polymers was not found. When the copolymer was then formed into a film of 100 microns in thickness at a resin temperature of 200° C. and an extrusion rate of 0.8 kg/hr by means of a T-die extruder of 20 mm in diameter, a film excellent in transparency having 5 or less fish eyes per 1,000 cm$^2$ was obtained.

COMPARATIVE EXAMPLE 1

Polymerization was conducted in the same manner as used in Example 1 except that the V-shaped groove between the packing and the retainer of the ultrahigh pressure pump was not filled with the polymerization inhibitor. As a result, leakage of the comonomer occurred at the packing of the ultrahigh pressure pump about 20 hours after initiation of the polymerization and, hence, the operation was stopped.

After the operation was stopped, the ultrahigh pressure pump and the conduit were dismantled and checked. However, the plunger of the pump could not be withdrawn from the pump due to the formation of polymers. Furthermore, the valves and the conduit were found to be clogged by the polymers.

COMPARATIVE EXAMPLE 2

Polymerization was conducted in the same manner as used in Example 1 except that the V-shaped groove between the packing and the retainer of the ultrahigh pressure pump was filled with a silicone grease containing 1% of p-benzoquinone as the polymerization inhibitor. As a result, leakage of the comonomer occurred at the packing of the ultrahigh pressure pump about 40 hours after initiation of the polymerization and, hence, the operation was stopped.

After the operation was stopped, the ultrahigh pressure pump and the conduit were dismantled and checked. As a result, polymers were observed on the cylinder packing of the pump.

COMPARATIVE EXAMPLE 3

Figure 3:
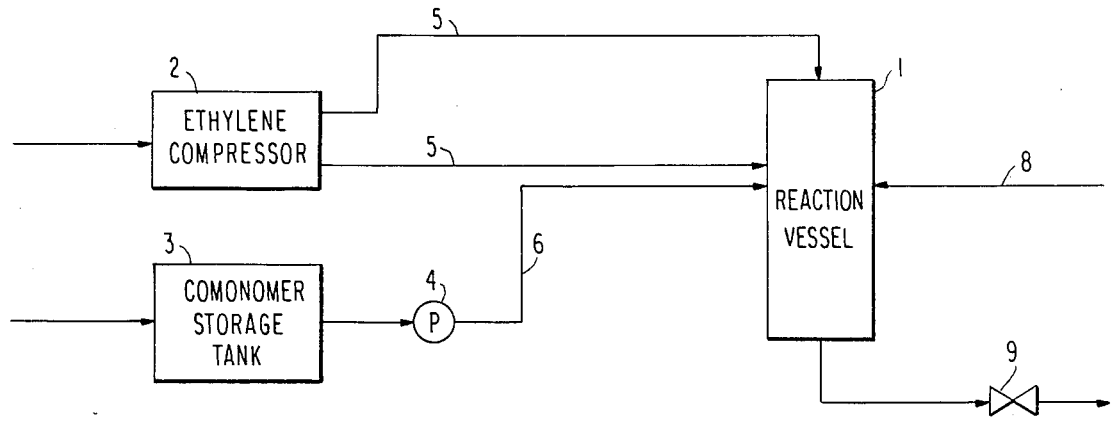

Polymerization was conducted in the same manner as used in Example 1 except that a tank-shaped reaction vessel having a conduit system as shown in FIG. 3 was used. As a result, there was found no abnormality in the ultrahigh pressure pump. However, when the copolymer thus prepared was tested for film properties in the same manner as used in Example 1 by means of a T-die extruder of 20-mm, it was observed that the number of fish eyes was 100 or more. Thus, the operation was stopped about 30 hours after initiation of the polymerization.

EXAMPLE 2

400 kg/hr of ethylene was compressed by an ultrahigh pressure compressor to 1,700 kg/cm$^2$. The ethylene was mixed with 15.0 kg/hr of dimethylaminoethyl methacrylate (Q value=0.68), a pressure of which had been increased to 1,700 kg/cm$^2$ by an ultrahigh pressure pump using a silicone grease containing 5% of hydroquinone monomethyl ether as a polymerization inhibitor filled in a V-shaped groove between a packing and a retainer and a polyalkylene glycol containing 3,000 ppm of hydroquinone monomethyl ether as a polymerization inhibitor added to a lubricating oil. These polymerization inhibitors had been incorporated into the system while a plunger and the packing were assembled. The mixture was carried into a tank-shaped reaction vessel (volume: 54 l; L/D=12) via a conduit system as shown in FIG. 1 and continuously polymerized with 60 g/hr of tert-butyl peroxypivalate being added thereto as a polymerization initiator at a reaction temperature of 160° C. As a result, 35 kg/hr of an ethylene-dimethylaminoethyl methacrylate having a melt index (determined in accordance with JIS K-6760) of 310 g/10 min., a density of 0.94, and a dimethylaminoethyl methacrylate content of 39% by weight was obtained.

A stable operation could be performed for about 200 hours after initiation of the polymerization. The operation was then stopped to check the ultrahigh pressure pump and the conduit. As a result, attachment of polymers was not found. 7.9% by weight of the comonomer, 92% by weight of a polypropylene homograde Noblen ® FL800 (produced by Sumitomo Chemical Co., Ltd.; melt index: 10 g/10 min. (determined in accordance with JIS K-6758)), and 0.1% by weight of Irganox ® 1010 (produced by Ciba-Geigy AG) as a stabilizer were melt kneaded at a temperature of 200° C. by means of an extruder of 30 mm in diameter (L/D=28) to obtain composition pellets. The pellets thus obtained were then formed into a film of 70 microns in thickness at a resin temperature of 200° C. and an extrusion rate of 0.8 kg/hr by means of a T-die extruder of 20 mm in diameter (L/D=20). As a result, a film excellent in transparency having 5 or less fish eyes per 1,000 cm$^2$ was obtained.

COMPARATIVE EXAMPLE 4

Polymerization was conducted in the same manner as used in Example 2 except that a tank-shaped reaction vessel (volume: 50 l; L/D=12) having a conduit system as shown in FIG. 3 was used and that a polyalkylene glycol containing no polymerization inhibitor was used as the lubricating oil. As a result, leakage of the comonomer occurred at the packing of the ultrahigh pressure pump about 30 hours after initiation of the polymerization and, hence, the operation was stopped. After the operation was stopped, the ultrahigh pressure pump and the conduit were dismantled and checked. As a result, polymers were observed on the cylinder packing of the pump. Furthermore, polymers were found to attach to the inner wall of the conduit in a thickness of about 1.0 mm.

COMPARATIVE EXAMPLE 5

Polymerization was conducted in the same manner as used in Example 2 except that a polyalkylene glycol containing 70 ppm of hydroquinone monomethyl ether as the polymerization inhibitor was used as the lubricating oil. As a result, leakage of the comonomer occurred at the packing of the ultrahigh pressure pump about 50 hours after initiation of the polymerization and, hence, the operation was stopped. Furthermore, polymers were observed on the inner wall of the conduit.

COMPARATIVE EXAMPLE 6

Polymerization was conducted in the same manner as used in Example 2 except that a tank-shaped reaction vessel having a conduit system as shown in FIG. 3 was used. As a result, there was found no abnormality on the ultrahigh pressure pump. A mixture of the copolymer and a polypropylene homograde Noblen ® FL800 was tested for film properties in the same manner as used in Example 2 by means of a T-die extruder of 20 mm in diameter. As a result, there were observed 300 or more fish eyes.

EXAMPLE 3

200 kg/hr of ethylene and 1.0 mol% (based on ethylene) of propane were compressed to 1,700 kg/cm$^2$ by an ultrahigh pressure compressor. The mixture was then mixed with 5.7 kg/hr of a methyl methacrylate (Q value=0.74) solution of 14% by weight of maleic anhydride (Q value=0.23), a pressure of which had been increased to 1,700 kg/cm$^2$ by an ultrahigh pressure pump using a silicone grease containing 10% of hydroquinone monomethyl ether as a polymerization inhibitor filled in a V-shaped groove between a packing and a retainer and polybutene containing 1,000 ppm of hydroquinone monomethyl ether as a polymerization inhibitor added to a lubricating oil. These polymerization inhibitors had been incorporated into the system while a plunger and the packing of the pump were assembled. The mixture was carried into a tank-shaped reaction vessel (volume=54 l; L/D=12) having a conduit system as shown in FIG. 1 and continuously polymerized with 15 g/hr of tert-butyl peroxypivalate being added thereto as a polymerization initiator at a reaction temperature of 180° C. As a result, 26 kg/hr of an ethylene-methyl methacrylate-maleic anhydride copolymer having a melt index (determined in accordance with JIS K-6760) of 8 g/10 min., a density of 0.94, a methyl methacrylate content of 18% by weight, and a maleic anhydride content of 3% by weight was obtained.

A stable operation could be performed for about 200 hours after initiation of the polymerization. The operation was then stopped. The ultrahigh pressure pump and the conduit were dismantled and checked. As a result, attachment of polymers was not found. The copolymer was then formed into a film of 70 microns in thickness at a resin temperature of 200° C. and an extrusion rate of 0.8 kg/hr by means of a T-die extruder of 20 mm in diameter (L/D=20). As a result, a film excellent in transparency having 15 or less fish eyes per 1,000 cm$^2$ was obtained.

COMPARATIVE EXAMPLE 7

Polymerization was conducted in the same manner as used in Example 3 except that polybutene free of the polymerization inhibitor was used as the lubricating oil for the ultrahigh pressure pump. As a result, the discharge pressure of the pump was raised to 2,000 kg/cm$^2$ against the reaction pressure of 1,700 kg/cm$^2$ about 20 hours after initiation of the polymerization and, hence, the operation was stopped.

After the operation was stopped, the ultrahigh pressure pump and the conduit were dismanteld and checked. As a result, polymers were found to attach to the inner wall of the conduit in a thickness of about 0.5 mm.

COMPARATIVE EXAMPLE 8

Polymerization was conducted in the same manner as used in Example 3 except that polybutene containing 50 ppm of hydroquinone monomethyl ether as the polymerization inhibitor was used as the lubricating oil. As a result, the discharge pressure of the ultrahigh pressure pump was raised to 2,000 kg/cm$^2$ about 30 hours after initiation of the polymerization and, hence, the operation was stopped. Furthermore, polymers were observed on the inner wall of the conduit.

COMPARATIVE EXAMPLE 9

Polymerization was conducted in the same manner as used in Example 3 except that a tank-shaped reaction vessel having a conduit system as shown in FIG. 3 was used. As a result, there was observed no abnormality in the ultrahigh pressure pump. However, when the copolymer was tested for film properties in the same manner as used in Example 3 by means of a T-die extruder of 20 mm in diameter, it was found that the number of fish eyes was 200 or more. Thus, the operation was stopped about 50 hours after initiation of the polymerization.

EXAMPLE 4

Figure 2:
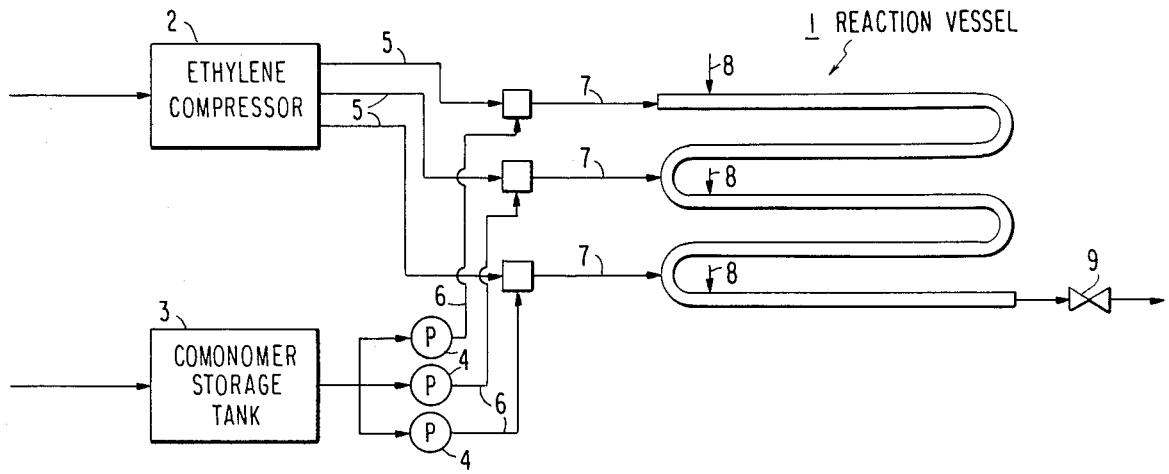

200 kg/hr of ethylene and 7.0 mol% (based on ethylene) of propane were compressed to 1,950 kg/cm$^2$ by an ultrahigh pressure compressor. The mixture was then mixed with 5.3 kg/hr of methyl methacrylate (Q value=0.74), a pressure of which had been increased to 1,950 kg/cm$^2$ by an ultrahigh pressure pump using a silicone grease containing 5% of hydroquinone monomethyl ether as a polymerization inhibitor filled in a v-shaped groove between a packing and a retainer of the pump and polybutene containing 500 ppm of hydroquinone monomethyl ether as a polymerization inhibitor used as a lubricating oil. These polymerization inhibitors had been incorporated into the system while a plunger and the packing of the pump were assembled. The mixture was then carried into a tubular reaction vessel (inner diameter: 13 mm; length: 300 m) having a conduit system as shown in FIG. 2 and continuously polymerized with 8 g/hr of tert-butyl peroxy-2-ethylhexanoate being added thereto as a polymerization initiator at a reaction temperature of 185° C. As a result, 25 kg/hr of an ethylene-methyl methacrylate copolymer having a melt index (determined in accordance with JIS K-6760) of 70 g/10 min., a density of 0.93, and a methyl methacrylate content of 20% by weight was obtained.

A stable operation could be performed for about 200 hours after initiation of the polymerization. The operation was then stopped. The ultrahigh pressure pump and the conduit were dismantled and checked. As a result, attachment of polymers was not found. Furthermore, when the copolymer was formed into a film of 70 microns in thickness at a resin temperature of 200° C. and an extrusion rate of 0.8 kg/hr by means of a T-die extruder of 20 mm in diameter, a film excellent in transparency having 10 or less fish eyes per 1,000 cm$^2$ was obtained.

COMPARATIVE EXAMPLE 10

Polymerization was conducted in the same manner as used in Example 4 except that a tubular reaction vessel (inner diameter: 13 mm; length: 300 m) having a conduit system as shown in FIG. 2 was used, the V-shaped groove between the packing and the retainer of the ultra-high pressure pump was not filled with a polymerization inhibitor, and that polybutene free of a polymerization inhibitor was used as the lubricating oil. As a result, leakage of the comonomer occurred at the packing of the ultrahigh pressure pump about 50 hours after initiation of the polymerization and, hence, the operation was stopped.

After the operation was stopped, the ultrahigh pressure pump and the conduit were dismantled and checked. As a result, polymers were found to attach to the inner wall of the conduit in a thickness of about 0.5 mm.

COMPARATIVE EXAMPLE 11

Polymerization was conducted in the same manner as used in Example 4 except that the V-shaped groove between the packing and the retainer of the ultrahigh pressure pump was filled with a silicone grease containing 1% of hydroquinone monomethyl ether as a polymerization inhibitor and that polybutene containing 20 ppm of hydroquinone monomethyl ether as a polymerization inhibitor was used as the lubricating oil. As a result, leakage of the comonomer occurred at the packing of the ultrahigh pressure pump about 70 hours after initiation of the polymerization and, hence, the operation was stopped.

Furthermore, polymers were found on the inner wall of the conduit.

COMPARATIVE EXAMPLE 12

Polymerization was conducted in the same manner as used in Example 4 except that a tubular reaction vessel having a conduit system as shown in FIG. 4 was used. As a result, there was observed no abnormality in the ultrahigh pressure pump. However, when the copolymer was tested for film properties in the same manner as used in Example 4 by means of a T-die extruder of 20 mm in diameter, it was found that the number of fish eyes was 200 or more.

EXAMPLE 5

220 kg/hr of ethylene was compressed to 2,000 kg/cm$^2$ by an ultrahigh pressure compressor. The ethylene was then mixed with 26 kg/hr of methyl acrylate (Q value=0.42) and 1.3 kg/hr of glycidyl methacrylate (Q value=0.85) at separate lines, pressures of which had been respectively increased to 2,000 kg/cm$^2$ by separate ultrahigh pressure pumps using a silicone grease containing 10% of p-benzoquinone as a polymerization inhibitor filled in a V-shaped groove between a packing and a retainer of the pump and polybutene containing 2,000 ppm of p-benzoquinone as a polymerization inhibitor used as a lubricating oil. These polymerization inhibitors had been previously incorporated into the system while a plunger and the retainer of the pump were assembled. The mixtures were then carried into a tank-shaped reaction vessel (volume: 54 l; L/D=12) having a conduit system as shown in FIG. 5 and continuously polymerized with 9 g/hr of tert-butyl peroxy-2-ethylhexanoate being added thereto as a polymerization inhibitor at a reaction temperature of 160° C. As a result, 42 kg/hr of an ethylene-methyl acrylate-glycidyl methacrylate copolymer having a melt index (determined in accordance with JIS K-6760) of 6 g/10 min., a density of 0.95, a methyl acrylate content of 60% by weight, and a glycidyl methacrylate content of 3% by weight was obtained.

A stable operation could be performed for about 200 hours after initiation of the polymerization. The operation was then stopped. The ultrahigh pressure pump and the conduit were then dismantled and checked. As a result, attachment of polymers was not found. Furthermore, when the copolymer was formed into a film of 60 microns in thickness at a resin temperature of 200° C. and an extrusion rate of 0.8 kg/hr by means of a T-die extruder of 20 mm in diameter (L/D=20), a film excellent in transparency having 5 or less fish eyes per 1,000 cm$^2$ was obtained.

COMPARATIVE EXAMPLE 13

Polymerization was conducted in the same manner as used in Example 5 except that a tank-shaped reaction vessel (volume: 54 l; L/D: 12) having a conduit system as shown in FIG. 6 was used, the V-shaped groove between the packing and the retainer of the ultrahigh pressure pump was filled with a silicone grease containing 0.5% of p-benzoquinone as a polymerization inhibitor, and that polybutene free of a polymerization inhibitor was used as a lubricating oil. As a result, the discharge pressure of the ultrahigh pressure pump was raised to 2,300 kg/cm$^2$ against the reaction pressure of 2,000 kg/cm$^2$ about 20 hours after initiation of the polymerization, causing leakage of the comonomer at the packing of the ultrahigh pressure pump and, hence, the operation was stopped.

After the operation was stopped, the ultrahigh pressure pump and the conduit were dismantled and checked. As a result, polymers were found to attach to the inner wall of the conduit in a thickness of about 0.5 mm.

COMPARATIVE EXAMPLE 14

Polymerization was conducted in the same manner as used in Example 5 except that the V-shaped groove between the packing and the retainer of the ultrahigh pressure pump was not filled with a polymerization inhibitor and that polybutene containing 50 ppm of p-benzoquinone as a polymerization inhibitor was used as a lubricating oil. As a result, leakage of the comonomer occurred at the packing of the ultrahigh pressure pump about 20 hours after initiation of the polymerization and, hence, the operation was stopped.

Furthermore, polymers were found to attach to the inner wall of the conduit in a thickness of about 0.5 mm.

COMPARATIVE EXAMPLE 15

Polymerization was conducted in the same manner as used in Example 5 except that a tank-shaped reaction vessel having a conduit system as shown in FIG. 6 was used. As a result, there was observed no abnormality in the ultrahigh pressure pump. However, when the copolymer was tested for film properties in the same manner as used in Example 5 by means of a T-die extruder of 20 mm in diameter, there were observed many lumps of fish eyes. Thus, the operation was stopped about 20 hours after initiation of the polymerization.

EXAMPLE 6

200 kg/hr of ethylene was compressed to 2,100 kg/cm$^2$ by an ultrahigh pressure compressor. The ethylene was then mixed with 22 kg/hr of methyl acrylate (Q value=0.42), a pressure of which had been increased to 2,100 kg/cm$^2$ by an ultrahigh pressure pump using a silicone grease containing 10% of hydroquinone monomethyl ether as a polymerization inhibitor filled in a V-shaped groove between a packing and a retainer of the pump. The polymerization inhibitor had been previously incorporated into the system while a plunger and the packing of the pump were assembled. The mixture was then carried into a tank-shaped reaction vessel (volume=54 l; L/D=12) having a conduit system as shown in FIG. 5 and continuously polymerized with 10 g/hr of tert-butyl peroxy-2-ethylhexanoate being added thereto as a polymerization initiator at a reaction temperature of 170° C. As a result, 38 kg/hr of an ethylene-methyl acrylate copolymer having a melt index (determined in accordance with JIS K-6760) of 5 g/10 min., a density of 0.95, and a methyl acrylate content of 58% by weight was obtained.

A stable operation could be performed for about 200 hours after initiation of the polymerization. The operation was then stopped. The ultrahigh pressure pump and the conduit were checked. As a result, attachment of polymers was not found. Furthermore, when the copolymer was formed into a film of 60 microns in thickness at a resin temperature of 200° C. and an extrusion rate of 0.8 kg/hr by means of a T-die extruder of 20 mm in diameter (L/D=20), a film excellent in transparency having 5 or less fish eyes per 1,000 cm$^2$ was obtained.

COMPARATIVE EXAMPLE 16

Polymerization was conducted in the same manner as used in Example 6 except that the V-shaped groove between the packing and the retainer of the ultrahigh pressure pump was not filled with a polymerization inhibitor. As a result, leakage of the comonomer occurred at the packing of the ultrahigh pressure pump about 20 hours after initiation of the polymerization and, hence, the operation was stopped.

Furthermore, polymers were found to attach to the inner wall of the conduit.

Tables 1 to 3 show the summary of Examples 1 to 6 and Comparative Examples 1 to 16.

TABLE 1

| | Ex. 1 | Comp. Ex. 1 | Comp. Ex. 2 | Comp. Ex. 3 | Ex. 2 | Comp. Ex. 4 | Comp. Ex. 5 | Comp. Ex. 6 |
|---|---|---|---|---|---|---|---|---|
| Outline | Example of process for preparation of ethylene-glycidyl methacrylate copolymer | | | | Example of process for preparation of ethylene-dimethylaminoethyl methacrylate copolymer | | | |
| Type of reaction vessel | Tank-shaped reaction vessel (volume: 54 l; L/D = 12) | | | | Tank-shaped reaction vessel (volume: 54 l; L/D = 12) | | | |
| Conduit system (FIG. No.) | FIG. 1 | FIG. 1 | FIG. 1 | FIG. 3 | FIG. 1 | FIG. 3 | FIG. 1 | FIG. 3 |
| Reaction pressure (kg/cm$^2$) | 1,500 | | | | 1,700 | | | |
| Reaction temperature (°C.) | 195 | | | | 160 | | | |
| Type of polymerization initiator | p-Butyl peroxy-2-ethylhexanoate | | | | t-Butyl peroxypivalate | | | |
| Added amount of polymerizaton initiator (g/hr) | 8 | | | | 60 | | | |
| Supply amount of ethylene (kg/hr) | 200 | | | | 400 | | | |
| Type of comonomer | Glycidyl methacrylate (Q value = 0.85) | | | | Dimethylaminoethyl methacrylate (Q value = 0.68) | | | |
| Supply amount of comonomer (kg/hr) | 3.3 | | | | 15.0 | | | |
| Type of chain transfer agent | Propane | | | | None | | | |
| Density of chain transfer agent (mol %) | 2.6 | | | | — | | | |
| Produced amount of polymer (kg/hr) | 26 | | | | 35 | | | |
| Density of polymer (g/cc) | 0.93 | | | | 0.94 | | | |
| Melt index of polymer* (g/10 min) | 2 | | | | 310 | | | |
| Content of comonomer in polymer (wt %) | 12 | | | | 39 | | | |
| Type of polymerization inhibitor filled in gap between rubber packing and retainer of ultrahigh pressure pump | PBQ** | None | PBQ | PBQ | MEHQ*** | MEHQ | MEHQ | MEHQ |
| Density of polymerization inhibitor added to grease-like oil (wt %) | 10 | — | 1 | 10 | 5 | 5 | 5 | 5 |
| Type of polymerization inhibitor dissolved in lubricating oil for ultrahigh pressure pump for compressing and carrying comonomer | PBQ | PBQ | PBQ | PBQ | MEHQ | None | MEHQ | MEHQ |
| Density of polymerization inhibitor based on lubricating oil (ppm by weight) | 2,000 | 2,000 | 2,000 | 2,000 | 3,000 | — | 70 | 3,000 |
| Result: | | | | | | | | |
| Operation time (hr) | About 150 | About 20 | About 40 | About 30 | About 200 | About 30 | About 50 | About 200 |
| Pump state | No problem | Leakage of comonomer from packing. Plunger could not be withdrawn upon dismantling. | Leakage of comonomer from packing. | No problem | No problem | Leakage of comonomer from packing. | Leakage of comonomer from packing. | No problem |
| Conduit state | No problem | Nozzle was clogged after the operation was stopped. | Polymer observed attached. | No problem | No problem | About 1.0 mm thick polymer observed attached. | Polymer observed attached. | No problem |

TABLE 1-continued

| | Ex. 1 | Comp. Ex. 1 | Comp. Ex. 2 | Comp. Ex. 3 | Ex. 2 | Comp. Ex. 4 | Comp. Ex. 5 | Comp. Ex. 6 |
|---|---|---|---|---|---|---|---|---|
| Quality: | | | | | | | | |
| Fish eye (No./1,000 cm$^2$-film) | 5 or less | — | — | 100 or more | 5 or less as polypropylene composition | — | — | 300 or more as polypropylene composition |

*Determined in accordance with JIS K-6760
**PBQ: p-Benzoquinone
***MEHQ: Hydroquinone monomethyl ether

TABLE 2

| | Ex. 3 | Comp. Ex. 7 | Comp. Ex. 8 | Comp. Ex. 9 | Ex. 4 | Comp. Ex. 10 | Comp. Ex. 11 | Comp. Ex. 12 |
|---|---|---|---|---|---|---|---|---|
| Outline | Example of process for preparation of ethylene-methyl methacrylate-maleic anhydride terpolymer | | | | Example of process for preparation of ethylene-methyl methacrylate copolymer | | | |
| Type of reaction vessel | Tank-shaped reaction vessel (volume: 54 l; L/D = 12) | | | | Tubular reaction vessel (inner diameter: 13 mmφ; length: 300 m) | | | |
| Conduit system (FIG. No.) | FIG. 1 | FIG. 1 | FIG. 1 | FIG. 3 | FIG. 2 | FIG. 2 | FIG. 2 | FIG. 4 |
| Reaction pressure (kg/cm$^2$) | 1,700 | | | | 1,950 | | | |
| Reaction temperature (°C.) | 180 | | | | 185 | | | |
| Type of polymerization initiator | t-Butyl peroxypivalate | | | | t-Butyl peroxy-2-ethylhexanoate | | | |
| Added amount of polymerization initiator (g/hr) | 15 | | | | 8 | | | |
| Supply amount of ethylene (kg/hr) | 200 | | | | 200 | | | |
| Type of comonomer | Methyl methacrylate (Q value = 0.74) Maleic anhydride (Q value = 0.23) | | | | Methyl methacrylate (Q value = 0.74) | | | |
| Supply amount of comonomer (kg/hr) | Methyl methacrylate: 4.9 Maleic anhydride (in the form of solution in methyl methacrylate): 0.8 | | | | 5.3 | | | |
| Type of chain transfer agent | Propane | | | | Propane | | | |
| Density of chain transfer agent (mol %) | 1.0 | | | | 7 | | | |
| Produced amount of polymer (kg/hr) | 26 | | | | 25 | | | |
| Density of polymer (g/cc) | 0.94 | | | | 0.93 | | | |
| Melt index of polymer (g/10 min) | 8 | | | | 70 | | | |
| Content of comonomer in polymer (wt %) | Methyl methacrylate: 18 Maleic anhydride: 3 | | | | 20 | | | |
| Type of polymerization inhibitor filled in gap between rubber packing and retainer of ultrahigh pressure pump | MEHQ | MEHQ | MEHQ | MEHQ | MEHQ | None | MEHQ | MEHQ |
| Density of polymerization inhibitor added to grease-like oil (wt %) | 10 | 10 | 10 | 10 | 5 | — | 1 | 5 |
| Type of polymerization inhibitor dissolved in lubricating oil for ultrahigh pressure pump for compressing and carrying comonomer | MEHQ | None | MEHQ | MEHQ | MEHQ | None | MEHQ | MEHQ |
| Density of polymerization inhibitor based on lubricating oil (ppm by weight) | 1,000 | — | 50 | 1,000 | 500 | — | 20 | 500 |
| Result: | | | | | | | | |
| Operation time (hr) | About 200 | About 20 | About 30 | About 50 | About 200 | About 50 | About 70 | About 100 |
| Pump state | No problem | Reaction was stopped due to rise in pump discharge pressure. | Reaction was stopped due to rise in pump discharge pressure. | No problem | No problem | Leakage of comonomer from packing. | Leakage of comonomer from packing. | No problem |
| Conduit state | No | About | Polymer | No | No | About | Polymer | No problem |

TABLE 2-continued

|  | Example No. | | | | | | | |
|---|---|---|---|---|---|---|---|---|
|  | Ex. 3 | Comp. Ex. 7 | Comp. Ex. 8 | Comp. Ex. 9 | Ex. 4 | Comp. Ex. 10 | Comp. Ex. 11 | Comp. Ex. 12 |
|  | problem | 0.5 mm thick polymer observed attached. | observed attached. | problem | problem | 0.5 mm thick polymer observed attached. | observed attached. |  |
| Quality: |  |  |  |  |  |  |  |  |
| Fish eye (No./1,000 cm²-film) | 15 or less | — | — | 200 or more | 10 or less | — | — | 200 or more |

TABLE 3

|  | Example No. | | | | | |
|---|---|---|---|---|---|---|
|  | Ex. 5 | Comp. Ex. 13 | Comp. Ex. 14 | Comp. Ex. 15 | Ex. 6 | Comp. Ex. 16 |
| Outline | Example of process for preparation of ethylene-methyl acrylate-glycidyl methacrylate terpolymer | | | | Example of process for preparation of ethylene-methyl acrylate copolymer | |
| Type of reaction vessel | Tank-shaped reaction vessel (volume: 54 l; L/D = 10) | | | | Tank-shaped reaction vessel (volume: 54 l; L/D = 20) | |
| Conduit system (FIG. No.) | FIG. 5 | FIG 6 | FIG. 5 | FIG. 6 | FIG. 5 | FIG. 6 |
| Reaction pressure (kg/cm²) | 2,000 | | | | 2,100 | |
| Reaction temperature (°C.) | 160 | | | | 170 | |
| Type of polymerization initiator | t-Butyl peroxy-2-ethylhexanoate | | | | t-Butyl peroxy-2-ethylhexanoate | |
| Added amount of polymerization initiator (g/hr) | 9 | | | | 10 | |
| Supply amount of ethylene (kg/hr) | 220 | | | | 200 | |
| Type of comonomer | Methyl acrylate (Q value = 0.42) Glycidyl methacrylate (Q value = 0.85) | | | | Methyl acrylate (Q value = 0.42) | |
| Supply amount of comonomer (kg/hr) | Methyl acrylate: 26, Glycidyl methacrylate: 1.3 | | | | 22 | |
| Type of chain transfer agent | None | | | | None | |
| Density of chain transfer agent (mol %) | — | | | | — | |
| Produced amount of polymer (g/hr) | 42 | | | | 38 | |
| Density of polymer (g/cc) | 0.95 | | | | 0.95 | |
| Melt index of polymer (g/10 min) | 6 | | | | 5 | |
| Content of comonomer in polymer (wt %) | Methyl acrylate: 60, Glycidyl methacrylate: 3 | | | | 58 | |
| Type of polymerization inhibitor filled in gap between rubber packing and retainer of ultrahigh pressure pump | PBQ | PBQ | None | PBQ | MEHQ | None |
| Density of polymerization inhibitor added to grease-like oil (wt %) | 10 | 0.5 | — | 10 | 10 | — |
| Type of polymerization inhibitor dissolved in lubricating oil for ultrahigh pressure pump for compressing and carrying comonomer | PBQ | None | PBQ | PBQ | None | None |
| Density of polymerization inhibitor based on lubricating oil (ppm by weight) | 2,000 | — | 50 | 2,000 | — | — |
| Result: |  |  |  |  |  |  |
| Operating time (hr) | About 200 | About 20 | About 20 | About 20 | About 200 | About 20 |
| Pump state | No problem | Leakage of comonomer from packing due to rise in pump discharge pressure. | Leakage of comonomer from packing. | No problem | No problem | Leakage of comonomer from packing. |
| Conduit state | No problem | About 0.5 mm thick polymer observed attached. | Amout 0.5 mm thick polymer observed attached. | No problem | No problem | Polymer observed attached. |
| Quality: |  |  |  |  |  |  |
| Fish eye (No./1,000 cm²-film) | 5 or less | — | — | Lumps of fish eyes | 5 or less | — |

INDUSTRIAL APPLICABILITY

The present invention prevents heat homopolymerization of comonomers, whereby leakage of the comonomers from the packing of the pump and danger such as clogging of the conduit and breakage of the pump can be prevented. The present invention also can remarkably reduce the frequency of dismantling and cleaning of the pump, conduit and inlet nozzle after the end of the operation, improving operation efficiency. This reduces the cost. Furthermore, the effect of diffusion of the comonomer into ethylene gas is sufficiently attained, further improving random copolymerizability. This not only enables the production of a high-quality copolymer having less gel content but also facilitates the reaction control, improving the reaction stability. Thus, the present invention has an extremely great industrial significance.

What is claimed is:

1. A process for the preparation of an ethylene copolymer which comprises introducing ethylene and one or more comonomers having a Q value (copolymerization reactivity index) of 0.1 or more, which are copolymerizable with ethylene, into a tank-shaped or tubular reaction vessel by means of an ultrahigh pressure pump and copolymerizing the comonomer or comonomers with ethylene at a pressure of 500 to 3,000 kg/cm$^2$ and at a temperature of 100° to 350° C. using an initiator in the presence or absence of a chain transfer agent, characterized in that (1) a gap between a packing and a retainer in the ultrahigh pressure pump for the comonomer is filled with a grease having incorporated thereinto 2 to 20% by weight of a polymerization inhibitor, and that (2) the comonomer or comonomers and a part or the whole of ethylene which has been compressed by a compressor are previously mixed with each other at the point where heat transfer from the reaction vessel is negligible before being introduced into the reaction vessel.

2. A process as claimed in claim 1, wherein said comonomer is selected from the group consisting of acrylic acid, methacrylic acid, ethyl acrylate, ethyl methacrylate, methyl acrylate, methyl methacrylate, glycidyl acrylate, glycidyl methacrylate, dimethylaminoethyl methacrylate, and maleic anhydride.

3. A process for the preparation of an ethylene copolymer which comprises introducing ethylene and one or more comonomers having a Q value (copolymerization reactivity index) of 0.1 or more which are copolymerizable with ethylene into a tank-shaped or tubular reaction vessel by means of an ultrahigh pressure pump, and copolymerizing the comonomer or comonomers with ethylene at a pressure of 500 to 3,000 kg/cm$^2$ and at a temperature of 100° to 350° C. using an initiator in the presence or absence of a chain transfer agent, characterized in that (1) a gap between a packing and a retainer of the ultrahigh pressure pump for the comonomer is filled with a grease having incorporated thereinto 2 to 20% by weight of a polymerization inhibitor and 100 to 5,000 ppm by weight of a polymerization inhibitor is added to a lubricating oil in the ultrahigh pressure pump for the comonomer and that (2) the comonomer or comonomers and a part or the whole of ethylene which has been compressed by a compressor are previously mixed with each other at the point where heat transfer form the reaction vessel is negligible before being introduced into the reaction vessel.

4. A process as claimed in claim 1, wherein said comonomer is selected from the group consisting of acrylic acid, methacrylic acid, ethyl acrylate, ethyl methacrylate, methyl acrylate, methyl methacrylate, glycidyl acrylate, glycidyl methacrylate, dimethylaminoethyl methacrylate, and maleic anhydride.

* * * * *